United States Patent [19]

Kashiwa

[11] 4,071,672

[45] Jan. 31, 1978

[54] PROCESS FOR POLYMERIZING OR COPOLYMERIZING OLEFINS

[75] Inventor: Norio Kashiwa, Iwakuni, Japan

[73] Assignee: Mitsui Petrochemical Industries Ltd., Tokyo, Japan

[21] Appl. No.: 599,582

[22] Filed: July 28, 1975

Related U.S. Application Data

[63] Continuation of Ser. No. 412,612, Nov. 5, 1973, abandoned.

[30] Foreign Application Priority Data

Nov. 10, 1972  Japan .............................. 47-112151
Dec. 27, 1972  Japan .............................. 48-130052

[51] Int. Cl.$^2$ .......................... C08F 4/02; C08F 10/02
[52] U.S. Cl. ............................. 526/122; 252/429 B; 252/429 C; 526/125; 526/127; 526/128; 526/352
[58] Field of Search ................. 526/122, 125, 128, 129

[56] References Cited

U.S. PATENT DOCUMENTS 3,642,746  2/1972  Kashiwa et al. .................... 526/125

FOREIGN PATENT DOCUMENTS 2,113,313  5/1972  France.
2,137,872  2/1972  Germany.

*Primary Examiner*—Edward J. Smith
*Attorney, Agent, or Firm*—Sherman & Shalloway

[57] ABSTRACT

In a process for polymerizing or copolymerizing olefins in the presence of a catalyst composed of (a) a transition metal catalyst component prepared by reacting a titanium or vanadium compound and a solid carrier of a magnesium compound and (b) an organometallic compound catalyst component of a metal of groups I to III of the periodic table; the improvement wherein said transition metal catalyst component is a reaction product of a solid carrier which is an adduct formed between a magnesium dihalide and an electron donor, a compound of Si or Sn selected from the group consisting of their halogen and organohalogen compounds and a titanium or vanadium compound.

26 Claims, No Drawings

PROCESS FOR POLYMERIZING OR COPOLYMERIZING OLEFINS

This is a continuation, division, of application Ser. No. 412,612, filed Nov. 5, 1973, now abandoned.

This invention relates to an improved process for polymerizing or copolymerizing olefins with commercial advantage and good quality reproducibility using a new catalyst composition which exhibits improved high activity and is capable of giving a polymer of a proper particle size and a narrow particle size distribution. This process is especially suitable for use in continuous polymerization methods.

Previously, British Patent 1,256,851 (U.S. Pat. No. 3,718,636) proposed the use of, as a transition metal catalyst component capable of giving a polyolefin of a wide molecular weight distribution, a solid reaction product obtained by reacting a solid carrier composed of a compound of a divalent metal including magnesium, especially a hydroxyhalide, partially hydroxylated halide, oxide, complex oxide, complex hydroxide, alcoholate, inorganic oxyacid salt, or mono- or polycarboxylic acid salt, with an organoaluminum compound or organomagnesium compound, then separating the resulting solid from the reaction product system, further reacting the separated solid reaction product with a transition metal compound in the absence of a liquid diluent, and thereafter removing the final solid product from the system. In this patent, it is essential to separate the solid reaction product from the product obtained by the reaction of the carrier with the organometal compound. It is further required that the separated solid reaction product be washed with an inert solvent and then dried, and the reaction of this product with a transition metal compound be carried out in the absence of even a trace of a diluent. As a result, the procedure of preparing the catalyst component has the disadvantage that the finely divided solid must be separated and washed without bringing it into contact with air or moisture, and then dried completely.

According to the specification of Belgian Patent No. 767,586 laid open on Nov. 25, 1971 relating to the above cited improvement, a solid carrier expressed by the formula $X_{2-n}M(OR)_n$ wherein X is a monovalent inorganic group, especially a halogen atom, M is a divalent metal atom such as Mg, and R is a monovalent hydrocarbon group having 1 to 20 carbon atoms, and $0 < n = 2$, is reacted with an organoaluminum compound expressed by the formula $AlR'_pY_{3-p}$ wherein R' is a monovalent hydrocarbon having 1 to 20 carbon atoms, Y is a halogen atom, and $1 < p < 3$, a solid product is separated from the reaction product, and the separated product is reacted with a halogen derivative of a transition metal in the absence of a liquid diluent, followed by separating a solid product from the reaction product; and the resulting compound is used as the transition metal catalyst component in the above-mentioned patent. The preparation of such a transition metal catalyst component requires a complicated and careful operation.

Furthermore, prior to the above attempt, it was proposed in British Pat. No. 927,969 to provide a polyolefin, especially polypropylene, having excellent stereospecificity by the vapor phase polymerization method utilizing as a catalyst component a reaction product which is obtained by reacting a solid carrier composed, for example, of $CaCO_3$, $CaCl_2$ or $NaCl$ with an organometallic compound, and than reacting the resulting reaction product with a transition metal compound. In this proposal, it is essential to heat-treat the above catalyst component, and if this heat-treatment is omitted, the resulting catalyst component cannot give polymers of increased stereospecificity. In addition, the catalyst obtained in this proposal has very poor activity.

We have made investigations about improved catalysts very suitable for polymerizing or copolymerizing an olefin, and found that catalysts which have improved high activity are capable of giving polymers of proper particle size and a narrow particle size distribution, and are especially suitable for use in a continuous polymerization procedure. These catalysts can be prepared without the need for the above mentioned complicated and careful control or the heat-treatment of the catalyst component in the above-mentioned prior attempts. It has been found that this improvement can be accomplished by using a reaction product of a donor-adduct of magnesium dihalide, a compound of Si or Sn selected from the group consisting of their halogen and organohalogen compounds and titanium or vanadium compounds as a transition metal catalyst component.

Furthermore, the improvement intended by the present invention cannot be achieved, as will be shown later by a comparative example, even by using apparently related catalysts composed of organo-Si compounds or organo-Sn compounds belonging to metal compounds of metals of Groups IV of the periodic table and a solid reaction obtained by reacting a reaction product isolated which has been formed by the reaction of a donor-adduct of a magnesium dihalide instead of the $X_{2-n}Mg(OR)_n$ in the above second proposal and a compound $AlR'_pY_{3-p}$, with a transition metal halogen derivative in the absence of a diluent.

Accordingly, an object of this invention is to provide an improved process for polymerizing or copolymerizing an olefin.

Many other objects of this invention along with its advantages will become more apparent from the following description.

According to the process of this invention, an olefin is polymerized, or the olefin and another olefin and/or diolefin are copolymerized in the presence of a catalyst composed of (a) a transition metal catalyst component obtained by reacting a solid carrier consisting of a donor-adduct of magnesium dihalide, a compound of Si or Sn selected from the group consisting of their halogen and organohalogen compounds and a titanium or vanadium compound, and (b) an organometallic compound of a metal of Groups I to III of the periodic table, preferably an organoaluminum compound.

The present invention is effective especially for the polymerization or copolymerization of an olefin or olefins selected from the group consisting of ethylene, propylene, a mixture of ethylene and another β-olefin, a mixture of ethylene or propylene and a diolefin, and a mixture of ethylene, another β-olefin and a diolefin. Examples of the other β-olefin or diolefin are propylene, butene-1, hexene-1,4-methylpentent-1, octene-1, butadiene, isoprene, ethylidenenorbornene, dicyclopentadiene and 1,4-hexadiene.

In the polymerization of olefins using the catalyst of this invention, the yielded amount of polymer per unit weight of the transition metal atom is increased, and the amount of the polymer obtained per unit weight of the carrier (the weight of the supported transition metal compound can be neglected as compared with the weight of the carrier) is also improved. As a result, the halogen content of the polymer ascribable to the carrier remaining therein can be markedly reduced. In addition, since the particle diameter of the resulting polymer is within a suitable range and uniform, the formation of large coarse polymer particles which constitute a serious setback in continuous polymerization of very fine polymer particles can be prevented.

Furthermore, since the catalyst system containing as one ingredient the supported transition metal compound obtained in accordance with the present invention gives the polymer in a very large amount per unit weight of the transition metal compound or the carrier, even if the catalyst removing step in the polymerization process is completely omitted, there is no problem which may seriously affect the commercial value of the polymer, such as reduced color of the polymer, or the rusting of the mold at the time of fabrication owing to the residual halogen in the polymer. In addition, the molecular weight distribution of the polymer becomes broader than in the case of not using a silicon or tin halogen compound or organohalogen compound at the time of catalyst preparation. This can lead to the preparation of polymers having good flowing characteristics in fabrication.

The solid carrier used in this invention is a carrier in which a donor is coordinated with a magnesium dihalide such as dichloride, dibromide, diiodide or difluoride, magnesium dichloride and magnesium dibromide being preferred.

The properties of the resulting catalyst can be varied somewhat according to the type and amount of the donor. Generally, it is recommended that the amount of the donor to be added is 0.1 to 10 mols per mol of the magnesium dihalide. In order to prepare a titanium catalyst component constituting a catalyst system which has high activity and permits the omission of treating the catalyst residue after polymerization, the donor is used preferably in an amount of at least 4 mols, most preferably at least 6 mols, per mol of the magnesium dihalide.

Usually, the magnesium dihalide is used in the anhydrous form. The term "anhydrous", used herein, does not exclude the use of reagent grade compounds commercially available under the designation "anhydrous" which contain a very small amount of moisture.

If the amount of the donor is too small, the polymerization activity of the catalyst per unit amount of the titanium or vanadium atom is low, and the resulting catalyst gives polymers in the form of coarse or ultra-fine particles which are undesirable and have a non-uniform particle size distribution. As a result of pretreatment with the donor, the particles of the magnesium dihalide are more finely divided than before the treatment, and an infrared absorption spectroscopic analysis and an X-ray analysis of the product shows that it is converted to an adduct of the magnesium dihalide and the donor. The reaction of the magnesium dihalide carrier with the donor is generally carried out, for example, at a temperature of −10° C. to +100° C. The reaction proceeds satisfactorily at room temperature. Most usually, the reaction temperature is from 0° C. to 100° C., preferably 10° C. to 60° C. In any case, the temperature to be employed is such that the resulting adduct is neither decomposed nor converted to another compound. The reaction time is generally 10 minutes to 2 hours. Usually, the reaction is performed in an atmosphere of nitrogen in an inert organic medium. Examples of the medium are those utilized for polymerization, and include hexane, heptane, kerosene, benzene, xylene, and fluorobenzene.

The alcohol-adduct magnesium dihalide is produced by other conventional methods. For example, it can be prepared by reacting metallic magnesium with ethanol containing dry hydrochloric acid to form $MgCl_2 \cdot 6$-EtOH [Russian Journal of Inorganic Chemistry, Vol. 12, No. 6, 901 (1967)].

Preferably, the donor used in this invention is selected from the group consisting of water, aliphatic alcohols, aliphatic carboxylic acids, aliphaic carboxylic acid esters, aromatic carboxylic acid esters, aliphatic ketones and aromatic ketones. Especially preferred donors include water, saturated or unsaturated aliphatic alcohols containing 1 to 12 carbon atoms, saturated or unsaturated aliphatic carboxylic acids containing 1 to 12 carbon atoms, esters formed between saturated aliphatic carboxylic acids containing 1 to 12 carbon atoms and saturated aliphatic alcohols containing 1 to 12 carbon atoms, esters formed between saturated aliphatic carboxylic acids containing 1 to 12 carbon atoms and unsaturated aliphatic alcohols containing 2 to 12 carbon atoms, esters formed between unsaturated aliphatic carboxylic acids containing 3 to 12 carbon atoms and saturated aliphatic alcohols containing 1 to 12 carbon atoms, esters formed between unsaturated aliphatic carboxylic acids containing 3 to 12 carbon atoms and unsaturated aliphatic alcohols containing 2 to 12 carbon atoms, esters formed between aromatic carboxylic acids containing 7 to 12 carbon atoms and saturated or unsaturated aliphatic alcohols containing 1 to 12 carbon atoms, and aliphatic ketones containing 3 to 13 carbon atoms.

Specific examples of the donors include aliphatic carboxylic acids such as acetic acid, propionic acid, valeric acid or acrylic acid, aliphatic carboxylic acid esters such as methyl formate, dodecyl formate, ethyl acetate, butyl acetate, vinyl acetate, methyl acrylate, or octyl acetate, aromatic carboxylic acid esters such as methyl benzoate, or ethyl benzoate, aliphatic ketones such as acetone, methylisobutyl ketone, ethylbutyl ketone or dihexylketone, aromatic ketones such as acetophenone, and aliphatic alcohols such as methanol, ethanol, isopropanol, hexanol, 2-ethylhexanol, octanol, or decanol. The use of the aliphatic alcohols is most preferred.

The resulting donor-adduct of magnesium dihalide is then reacted with a compound of Si or Sn and a titanium or vanadium compound. This reaction can be carried out in many embodiments.

The preferred embodiments include, for example, (1) a method wherein the donor-adduct of magnesium dihalide is brought into contact with a silicon and/or tin halogen compound, and then brought into contact with a transition metal compound, and (2) a method wherein the donor-adduct of magnesium dihalide is brought into contact substantially simultaneously with the silicon and/or tin halogen compound and the transition metal compound. When a part of the donor-adduct of magnesium dihalide is treated by the method (1) above, the remainder is treated by the method (2), and a blend of these is used as the transition metal catalyst component (a), or when one of the silicon and/or tin halogen compound, and the transition metal compound is used in excess of the other, the charging of these compounds does not necessarily begin and end at the same time. Accordingly, one part of the carrier supporting reaction may sometimes be performed differently from the other part.

The reaction of the donor-adduct of magnesium dihalide with a compound of Si or Sn and a titanium or vanadium compound can be performed in the presence or absence of an inert organic solvent. At this time, it is not necessary to separate the adduct from the reaction product system, but rather the compound of Si or Sn and Ti or V compound can be added to the reaction product system containing the adduct. Where the method (1) described above is employed, the donor adduct of magnesium dihalide is contacted with the halogen compound of Si and/or Sn at −20° C. to 100° C., preferably 20° to 40° C., and the temperature of contact with the transition metal compound is −20° to 140° C., preferably 20° to 140° C. When the method (2) is employed, the reaction temperature is −20° to 140° C., preferably 20° to 140° C.

It is sufficient that the reaction time is about 10 minutes to 5 hours. Usually, the compound of Si or Sn may be used in an amount of at least 1/50 times (mol) per mol of the donor used, preferably, at least one-fourth times (mol) per mol of the donor used. It is not necessary to use it in a large amount, but usually, amounts of 1/50 times to 50 times per mol of the donor used are sufficient. If the amount is too small, the particle size distribution of the resulting polymer tends to become non-uniform. Furthermore, large coarse particles unsuitable for continuous polymerization are prone to be formed. Also, there is a tendency towards the formation of a catalyst which exhibits only low polymerization activity. Therefore, it is preferable to use it in an amount of at least the lower limit specified above.

In the reaction of the donor-adduct of magnesium dihalide with a compound of Si or Sn and a titanium or vanadium compound, means such as conventional agitation or mechanical pulverization using a ball mill can be employed, if desired.

At the end of the reaction, a product insoluble in hydrocarbon is formed. The product may be separated from he hydrocarbon-soluble substance by such means as filtration, decantation or other suitable solid-liquid separating means. Preferably, the product is washed with an inert organic solvent such as hexane, heptane or kerosene. The catalyst component (a) so obtained can be utilized as such without particularly subjecting it to heat treatment.

The compound of Si or Sn is selected from the group consisting of halogen compounds and organohalogen compounds of Sn. Preferred compounds or Sn can be expressed by the following formulae

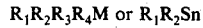

wherein M is Si or Sn, $R_1$, $R_2$, $R_3$ and $R_4$ are the same or different and each is selected from the group consisting of hydrogen alkyl, aryl, alkoxy, aryloxy and halogen, which contains at least one halogen atom.

The preferred alkyl has 1 to 8 carbon atoms. The preferred aryl includes phenyl and naphthyl. The preferred alkoxy has 1 to 8 carbon atoms. The aryloxy is preferably phenoxy or naphthoxy. The preferred halogens are chlorine and bromine.

Silicon tetrahalides, silicon alkylhalides, silicon hydrohalides, tin tetrahalides, tin dihalides, tin alkylhalides, and tin hydrohalides are especially preferred. Above all, the silicon tetrahalides and tin tetrahalides can be recommended. Specific examples of these compounds are silicon tetrabromide, tin tetrabromide, silicon tetrachloride, tin tetrachloride, methylsilicon trichloride, ethylsilicon trichloride, butylsilicon trichloride, dimethylsilicon dichloride, dithylsilicon dichloride, dibutylsilicon dichloride, trimethylsilicon chloride, triethylsilicon chloride, tributylsilicon chloride, methyltin trichloride, ethyltin trichloride, butyltin trichloride, dimethyltin dichloride, diethyltin dichloride, trimethyltin chloride, triethyltin chloride, monochlorosilane, dichlorosilane, trichlorosilane, tin chloride trihydride, tin dichloride dihydride, tin trichloride hydride, and tin dichloride. The silicon tetrachloride and tin tetrachloride are especially preferred.

Examples of the titanium or vanadium compound are compounds of the formula $TiX_4$ wherein X is a halogen atom, compounds of the formula $Ti(OR)_{4-n}X_n$ wherein X is the same as defined above, R is an alkyl group, preferably those containing 1 to 12 carbon atoms, n is zero or a positive number of less than 4, compounds of the formula $VOX_3$ wherein X is the same as defined above, and compounds of the formula $VX_4$ wherein X is the same as defined above. The titanium compounds are preferred, and especially the compounds of the formula $TiX_4$, above all titanium tetrachloride, are preferred.

In the present invention, there is used a catalyst composed of a combination of the transition metal catalyst component (a) described above and an organometallic compound catalyst component (b) of a metal of Groups I to III of the periodic table.

The organo-metallic compound catalyst component (b) may, for example, be compounds of the formula RM wherein R is an alkyl or aryl group, and M is lithium, sodium or potassium; compounds of the formula $R_2M'$ wherein R is the same as defined above and M' is zinc or cadmium; compounds of the formula $R_{2-l}MgX_l$ wherein R is the same as defined above, X is a halogen atom and $l$ is zero or 1; compounds of the formula $MAlR_4$, wherein R and M are the same as defined above; compounds of the formula $R'_{3-m}AlX_m$ wherein R' is a hydrogen atom, or an alkyl or aryl group, X is the same as defined above, and m is zero or a positive number of not greater than 3; compounds of the formula $R'_{3-n}Al(OR)_n$ wherein R' is the same as defined above, and n is a positive number greater than 0 but not greater than 3; and compounds of the formula $RAl(OR)X$ wherein R and X are the same as defined above.

If there are two or more of R, R' and X in each of the above formulae, they may be the same or different. Preferred alkyl groups represented by R or R' contain 1 to 12 carbon atoms, and preferred aryl groups represented by R or R' are phenyl and benzyl groups. X is preferably chlorine or bromine. Of the organometallic compounds exemplified above, the compounds of the formulae $R'_{3-m}AlX_m$, $R'_{3-n}Al(OR)_n$, $R_{2-l}MgX_l$ and dialkyl zincs are preferred. Examples are trialkyl aluminums, alkyl aluminum halides, alkyl aluminum hydrides, dialkyl zincs, dialkyl magnesiums, and alkyl magnesium halides. Specific examples include triethyl aluminum, diethyl aluminum hydride, tripropyl aluminum, tributyl aluminum; diethyl aluminum chloride, diethyl aluminum bromide, diethyl aluminum ethoxide, diethyl aluminum phenoxide, ethyl aluminum ethoxychloride, and ethyl aluminum sesquichloride. Of these, the trialkyl aluminum compounds such as triethyl aluminum, or tributyl aluminum, the dialkyl aluminum hydrides such as diisobutyl aluminum hydride, and the dialkyl aluminum halides such as diethyl aluminumchloride are preferred.

The polymerization of olefins using the catalyst of this invention is preferably carried out in an inert organic liquid medium (or an inert organic solvent). The amount of the transition metal catalyst component (a), is preferably 0.001 to 0.5 millimols calculated as the titanium or vanadium atom per liter of the inert organic liquid medium. The amount of the organometallic compound catalyst component (b) of a metal of Groups I to III of the periodic table is preferably at least 0.01 millimol, more preferably 0.01 to 50 millimols per liter of the inert organic liquid medium.

The olefin polymerizing reaction using the catalyst of this invention can be performed in the same way as in the case of olefin polymerization using the conventional Ziegler-type catalysts. The reaction is carried out in the substantial absence of oxygen and water. A suitable inert organic liquid medium, for example, an aliphatic hydrocarbon such as hexane, heptane or kerosene, is used. An olefin and the catalyst, and if desired, another olefin and/or diolefin are fed into the medium and polymerized.

The polymerization temperature may be usually 20 to 200° C., preferably 50° to 180° C. Generally, the reaction may be carried out at a pressure of 1 to 50 kg/cm$^2$, preferably 2 to 20 kg/cm$^2$. Preferably, the reaction is performed at an elevated pressure. The control of the molecular weight distribution by the conjoint use of the catalyst composition of this invention and hydrogen is effective not only for the batch-wise method, but also for the continuous polymerization of an olefin.

The advantages of using the catalyst system of this invention include an increased amount of polymer yielded per unit weight of the transition metal, a markedly increased amount of polymer yielded per unit weiht of the carrier, and a remarkably high bulk density of the resulting polymer. In addition, the resulting polymer is not in the form of large coarse particles, but instead its particle diameter is highly uniform. Consequently, the discharge and forwarding of the polymer in the continuous polymerization process become easy, and continuous polymerization can be performed very easily to give polymers in a large amount per unit weight of the catalyst used. Furthermore, since the amounts of the transition metal, halogen and residual carrier compound contained in the resulting polymer are very small, degeneration of the polyolefin fabricated article does not occur without particularly removing these substances, and a product containing them is adequate for ordinary uses. The magnesium halides used in this invention have the advantage of being soluble in water and alcohols. Thus, where it is necessary to remove the residual catalyst component completely, for example in the formation of thin yarns or films, the addition of alcohol and/or water can readily lead to the removal of the entire catalyst component including the carrier compound. In addition, it is very characteristic that in this case, there is hardly any residual transition metal component. With catalyst systems not using a carrier, the remainder of a minor amount of the transition metal compound cannot be avoided even if the residual catalyst is subjected to a decomposition treatment.

The carrier may contain a small amount of other metal, such as calcium, aluminum, zinc, manganese, iron, nickel, or cobalt.

The following Examples illustrate the present invention, in which the reaction system was shielded from oxygen and moisture from the beginning to the end of polymerization.

EXAMPLES 1 to 7 AND COMPARATIVE EXAMPLE 1 [Preparation of Catalyst — A]

191 g of commercially available anhydrous magnesium dihalide was suspended in 2 liters of refined kerosene, and each of the alcohols indicated in Table 1 was added dropwise to the suspension at 50° C. After the addition, the mixture was stirred for 4 hours.

Then, a mixture of 6 mols of each of the transition metal compounds indicated in Table 1 and 500 cc. of each of the silicon and/or tin halides shown in Table 1 was added to the above suspension as a donor, and the reaction was performed at 80° C. for 1 hour. The reaction product was thoroughly washed with refined kerosene to form a carrier-supported catalyst component.

[Preparation of Catalyst — B]

191 g of anhydrous magnesium dihalide was suspended in 2 liters of refined kerosene, and each of the alcohols shown in Table 1 was added to the suspension at 40° C. as a donor. The mixture was stirred for 4 hours. Two dropping funnels were prepared, and in one of them, 7 mols of each of the transition metal compounds shown in Table 1 was placed, and in the other, each of the silicon or tin compounds shown in Table 1 was placed in the amount shown in Table 1. These compounds were added dropwise almost simultaneously to the suspension, and the mixture was reacted at 80° C. for 3 hours. The reaction product was washed with kerosene to form a carrier-supported catalyst component.

[Polymerization

A 2-liter autoclave was charged with 1 liter of kerosene, 1 mmol of each of the organoaluminum compounds shown in Table 2 and 0.007 mmol, calculated as titanium or vanadium metal, of each of the carrier-supported catalysts prepared in A or B above, and the mixture was heated to 80° C. After adding hydrogen in an amount of 4 kg/cm$^2$, ethylene was continuously fed so that the total pressure of the autoclave reached 8 kg/cm$^2$, and polymerized for 2 hours. The polymer was separated by filtration, and dried without removing the catalyst. The polymerization conditions and the results obtained in regard to the preparation of the carrier-supported component and the resulting component are shown in Table 2.

Table 1

| Runs Nos. | MgX$_2$ | Electron donor Type | Amount * | Si/Sn compound Type | Amount * | Transition metal compound | Method of preparation | Carrier supported component Ti, V | X: |
|---|---|---|---|---|---|---|---|---|---|
| Ex. 1 | MgCl$_2$ | EtOH | 6 | SiOl$_2$ | 10 | TiCl$_4$ | A | 71 | 632 |
| 2 | " | " | 10 | " | 16 | " | " | 83 | 605 |
| 3 | " | " | 4 | SnCl$_4$ | 8 | " | " | 55 | 647 |
| 4 | " | n-HexOH | 5 | SiCl$_4$ | 10 | " | " | 75 | 622 |
| 5 | MgBr$_2$ | EtOH | 6 | SiCl$_4$ | 10 | Ti(OEt)Cl$_3$ | B | 73 | 635 |
| 6 | " | MeOH | 6 | SiBr$_4$ | 14 | TiBr$_4$ | A | 68 | 627 |

Table 1-continued

| Runs Nos. | $MgX_2$ | Electron donor Type | Amount * | Si/Sn compound Type | Amount * | Transition metal compound | Method of preparation | Carrier supported component Ti, V | X: |
|---|---|---|---|---|---|---|---|---|---|
| 7 | $MgCl_2$ | n-OctOH | 4 | $SiCl_4$ | 10 | $TiCl_4$ | B | 51 | 661 |
| Comparative Example 1 | " | EtOH | 6 | — | — | " | — | 41 | 683 |

*: Mols used per mol of Mg.
**: Mols used together with the transition metal compound.
Ti, V: The amount (mg/g) of the transition metal atom supported per gram of the carrier-supported component.
X: The amount of the halogen atom (mg/g) supported per gram of the carrier-supported catalyst component.
Me: methyl group, Et: ethyl group, Hex: hexyl group, Bu: butyl group,
Oct: octyl group, X: halogen.

Table 2

| Runs | Organo-metal compound | Carrier component | Yield (g) | Bulk density g/cm³ | M.I. | Polymerization activity per metal | per carrier | $\bar{M}w/\bar{M}n$ | >42 | Particle size distribution of polymer (mesh) wt % 42-60 | 60-100 | 100-150 | <150 |
|---|---|---|---|---|---|---|---|---|---|---|---|---|---|
| Ex. 1 | $Et_3Al$ | 4.73 | 381 | 0.353 | 3.05 | 54400 | 80500 | 6.4 | 4.7 | 18.8 | 31.5 | 19.5 | 25.5 |
| 2 | $i-Bu_2AlH$ | 4.05 | 350 | 0.346 | 2.98 | 50000 | 86400 | 6.3 | 5.2 | 22.7 | 34.6 | 21.1 | 16.4 |
| 3 | $Et_2AlCl$ | 6.11 | 137 | 0.351 | 0.65 | 19600 | 22400 | 6.6 | 4.9 | 19.9 | 35.8 | 18.8 | 20.6 |
| 4 | $Et_3Al$ | 4.48 | 322 | 0.327 | 3.11 | 46000 | 71900 | 6.9 | 5.2 | 25.4 | 34.6 | 22.5 | 12.3 |
| 5 | $Et_3Al$ | 4.60 | 293 | 0.334 | 2.98 | 41900 | 63700 | 6.1 | 5.1 | 26.1 | 36.4 | 19.2 | 13.2 |
| 6 | $EtAlCl_2$ | 4.94 | 116 | 0.301 | 0.46 | 16600 | 23500 | 6.0 | 5.0 | 27.4 | 35.9 | 19.8 | 11.9 |
| 7 | $n-Hex_3Al$ | 6.59 | 298 | 0.317 | 3.07 | 42600 | 45200 | 5.8 | 4.9 | 25.5 | 33.8 | 17.3 | 18.5 |
| Com. Ex. 1 | $Et_3Al$ | 8.24 | 101 | 0.291 | 1.21 | 14400 | 12300 | 3.5 | 51.3 | 29.2 | 10.2 | 6.4 | 1.9 |

Carrier component: Amount (mg) used of the carrier-supported catalyst component.
Per metal: Amount (g/mmol) of polymer per mol of the supported transition metal.
Per carrier: Yield (g/g) of polymer per gram of the carrier-supported catalyst component.

EXAMPLE 8 AND COMPARATIVE EXAMPLE 2

An autoclave having an effective capacity of 2 liters was charged continuously with 1 liter/hour of hexane, 1 mmol/hour of triethyl aluminum, and each of the carrier-supported catalyst components (0.007 mmol calculated as titanium) prepared in Example 1 and Comparative Example 1, and ethylene was introduced at a rate of 300 g per hour. Hydrogen was simultaneously introduced into the autoclave so that the melt index of the resulting polyethylene was maintained at 0.2 to 0.5, and the operation was made continuously for 180 hours. About 300 g of polyethylene was formed hourly, and the operation was conducted quite smoothly with no trouble at all. However, when the catalyst of Comparative Example 1 was used, the discharge of the polymer failed after a lapse of 10 hours from the initiation of the polymerization, because of the formation of a great amount of polymer in the form of particles about the size of rice grains. The operation had to be stopped.

EXAMPLE 9

0.014 mmol, calculated as titanium, of the carrier-supported catalyst component prepared in Example 1 and 3 mmols of triethyl aluminum were placed in 1 liter of kerosene, and hydrogen was introduced at a pressure of 3 kg/cm². Then, a gaseous mixture of ethylene and propylene containing 1.5 mol % of propylene was fed into the mixture at a temperature of 80° C., and polymerized for 2 hours while the total pressure was being maintained at 7 kg/cm². The amount yielded of the resulting ethylene/propylene copolymer was 311 g, and the copolymer had a melt index of 1.8 and contained 3 methyl groups per 1000 carbon atoms.

EXAMPLES 10 AND 11 AND COMPARATIVE EXAMPLES 2 AND 3

$MgCl_2.5CH_3COOC_4H_9$ and $MgCl_2.3CH_3COC_2H_5$ were synthesized, and 2 mols each of them was suspended in 1 liter of kerosene. To the suspension were added 5 mols of titanium tetrachloride and 20 mols of silicon tetrachloride, and the mixture was stirred for 1 hour at 120° C. After the reaction, the solid portion was washed to form a carrier-supported catalyst. For comparison, the above procedure was repeated except that the silicon tetrachloride was not used to form a carrier-supported catalyst component.

[Polymerization]

Polymerization was conducted under the same conditions as in Example 1 except that the amount of the carrier-supported catalyst component as titanium metal was changed to 0.01 mmol per liter of kerosene. The results obtained are shown in Table 3.

Table 3

| Runs | Carrier-supported catalyst component Chemical composition of the electron doner adduct | Amount supported * Ti | Amount used (mg) | Yielded amount (g) | Bulk density (g/cm³) | MI | Polymerization activity g/ml-mmol | g/g-carrier | >42 | Size distribution (wt %) 42-60 | 60-100 | 100-150 | <750 |
|---|---|---|---|---|---|---|---|---|---|---|---|---|---|
| Ex. 10 | $MgCl_2.5CH_3COOC_4H_9$ | 51 | 9.43 | 229 | 0.319 | 2.91 | 22900 | 24300 | 12.3 | 36.2 | 15.5 | 5.3 | 10.7 |
| Com. Ex. 2 | " | 142 | 3.38 | 52 | 0.250 | 0.65 | 5200 | 15400 | 52.9 | 34.1 | 12.4 | 0.5 | — |
| Ex. 11 | $MgCl_2.3CH_3COO_2H_5$ | 42 | 10.14 | 194 | 0.310 | 2.83 | 19400 | 19100 | 18.2 | 0.3 | 1.1 | 72.1 | 8.1 |
| Com. | | | | | | | | | | | | | |

Table 3-continued

| | Carrier-supported catalyst component | | | | | | Results of polymerization | | | | | | |
| | Chemical composition of the electron doner adduct | Amount supported * Ti | Amount used (mg) | Yielded amount (g) | Bulk density (g/cm³) | MI | Polymerization activity | | Size distribution (wt %) | | | | |
| Runs | | | | | | | g/ml-mmol | g/g-carrier | >42 | 42-60 | 60-100 | 100-150 | <750 |
| Ex. 3 | " | 110 | 4.36 | 42 | 0.251 | 0.45 | 4200 | 9600 | 60.0 | 32.0 | 6.3 | 1.0 | 0.7 |

*Amount supported: Amount (mg/g) supporter of titanium atom per gram of the carrier-supported component.

EXAMPLE 12

2 g of anhydrous magnesium chloride was dissolved in 20 cc of ethanol. A 1-liter flask was charged with 200 cc of kerosene, 4 cc of titanium tetrachloride and 30 cc of silicon tetrachloride. With stirring, an ethanol solution of magnesium chloride was addes dropwise at 80° C. After the addition, the mixture was stirred for 1 hour at 100° C. to precipitate the resultant solid compound. The supernatant liquid was thoroughly washed with hexane. It was found that 81 mg of titanium was supported per gram of the carrier-supported catalyst component. Ethylene was polymerized under the same conditions as in Example 1 using this catalyst in a concentration of 0.007 mmol calculated as titanium atom and 1 mmol of triethyl aluminum. There was obtained 394 g of polyethylene having a melt index of 5.12 and a bulk density of 0.330 g/cm³. This amount corresponds to 56300 g per mmol of titanium and 94900 g per gram of the carrier supported catalyst component. The particle size distribution of the polymer was such that it consisted of 3.1% by weight of particles having a size more than 42 mesh, 16.6% of 42 - 60 mesh particles, 38.4% of 60 - 100 mesh particles, 31.7% of 100 - 150 mesh particles, and 10.2% of particles finer than 150 mesh.

EXAMPLE 13

0.01 mmol of the catalyst prepared in Example 1 and 1 mmol of triethyl aluminum were placed in 1 liter of kerosene, and at 80° C. ethylene containing 10% by volume of butadiene was introduced at a rate of 200 g/hour. After a lapse of 1 hour, 184 of polyethylene was obtained which had a density of 0.930 g/cm³ and not more than 1 methyl group, 5.9 trans-vinyl groups, and 0.3 vinyl group per 1000 carbon atoms.

EXAMPLES 14 TO 23 AND COMPARATIVE EXAMPLES 4 AND 5

[Preparation of Catalyst]

200 g of each of the anhydrous magnesium dihalides was suspended in 2 liters of kerosene, and each of the electron donors indicated in Table 4 was added dropwise to the mixture over the course of 1 hour at room temperature. After the addition, the mixture was stirred for one hour, and then each of the silicon or tin halides was added dropwise in the course of 1 hour. Then, 15 mols of each of the transition metal compounds was added, and with stirring, the mixture was heated to 90° C. for 1 hour. The reaction product was thoroughly washed with refined kerosene to remove the excessive titanium or vanadium halide.

[Polymerization]

A 2-liter autoclave was charged with 1 liter of kerosene, 1 mmol of an alkylaluminum compound and a carrier-supported catalyst component in an amount corresponding to 0.007 mmol of titanium or vanadium metal, and the mixture was heated to 80° C. Hydrogen was introduced at a pressure of 4 kg/cm², and ethylene was continuously fed so that the total pressure reached 8 kg/cm³ and the mixture polymerized for two hours. The polymer obtained was separated by filtration, and dried without removing the catalyst. The data about the preparation of the carrier-supported catalyst component and the resulting component are shown in Table 4, and the polymerization conditions and the results obtained are shown in Table 5.

Table 4

| Runs | MgX₂ | Electron donor Type | Amount * | Si or Sn compound Type | Amount ** | Transition metal compound Type | Ti, V | X' |
|---|---|---|---|---|---|---|---|---|
| Ex. 14 | MgCl₂ | EtOH | 6 | SiCl₄ | 1.25 | TiCl₄ | 76 | 485 |
| 15 | " | n-HexOH | 6 | " | 5 | " | 66 | 512 |
| 16 | " | MeOH | 6 | SnCl₄ | 6 | Ti(OEt)Cl₃ | 64 | 488 |
| 17 | MgBr₂ | EtOH | 6 | SiCl₄ | 2 | TiBr₄ | 64 | 594 |
| 18 | MgCl₂ | MeCO₂Et | 6 | SiCl₄ | 3 | " | 55 | 634 |
| 19 | " | MeCOEt | 6 | SnCl₄ | 6 | TiCl₄ | 50 | 622 |
| 20 | " | EtOH | 6 | MeSnCl₃ | 2 | VCl₄ | 71 | 585 |
| 21 | " | " | 10 | SiCl₄ | 10 | TiCl₄ | 78 | 650 |
| 22 | " | " | 4 | " | 6 | " | 49 | 572 |
| Com. Ex. 4 | MgCl₂ | EtOH | 6 | — | 0 | TiCl₄ | 41 | 683 |
| 5 | " | MeCO₂ET | 6 | — | 0 | TiBr₄ | 32 | 715 |

*,**:Mols per mol of magnesium
Ti, V- Amount (mg/g) of the transition metal atom supported per gram of the carrier-supported catalyst component.
X': Amount (mg/g) of the halogen atom supported per gram of the carrier-supported catalyst component
Me: methyl group, Et: ethyl group, Hex: hexyl group, Bu: butyl group, X: halogen Table 5

| Runs | Organo-metal component | Carrier component | Yielded amount (g) | Bulk density (g/cm³) | MI | Polymerization per metal | per carrier | M̄w / M̄n | Particle size distribution of polymer (mesh wt.) | | | | | |
| | | | | | | | | | >42 | 42-60 | 60-100 | 100-150 | 150-200 | <200 |
| Ex. 14 | Et₃Al | | 4.43 | 364 | 0.351 | 2.64 | 52000 | 82200 | 5.9 | 5.3 | 20.0 | 33.9 | 18.4 | 15.2 | 7.1 |

Table 5-continued

| Runs | Organo-metal component | Carrier component | Yielded amount (g) | Bulk density (g/cm³) | MI | Polymerization per metal | Polymerization per carrier | $\bar{M}w$ / $\bar{M}n$ | >42 | 42-60 | 60-100 | 100-150 | 150-200 | <200 |
|---|---|---|---|---|---|---|---|---|---|---|---|---|---|---|
| 15 | iBu₃Al | 5.10 | 317 | 0.338 | 2.44 | 45300 | 62200 | 5.3 | 4.8 | 30.6 | 36.8 | 12.2 | 2.0 | 4.6 |
| 16 | iBu₂Al | 5.26 | 285 | 0.342 | 2.61 | 40700 | 54200 | 5.5 | 3.5 | 20.1 | 39.7 | 21.9 | 14.3 | 0.5 |
| 17 | Et₃Al | 5.26 | 288 | 0.330 | 2.88 | 41100 | 54800 | 5.3 | 5.0 | 21.0 | 36.5 | 21.4 | 10.0 | 5.3 |
| 18 | Et₂AlCl | 6.14 | 132 | 0.325 | 0.65 | 18900 | 21500 | 5.6 | 3.9 | 35.5 | 31.1 | 18.5 | 7.1 | 3.9 |
| 19 | EtAlCl₂ | 5.66 | 128 | 0.326 | 0.31 | 11100 | 11700 | 6.1 | 4.0 | 34.3 | 36.5 | 18.1 | 6.1 | 1.1 |
| 20 | Et₂AlCl | 4.92 | 39 | 0.274 | 0.14 | 5600 | 7900 | 4.3 | 10.9 | 34.0 | 42.0 | 6.5 | 2.1 | 3.5 |
| 21 | Et₃Al | 4.32 | 351 | 0.333 | 2.35 | 50100 | 81300 | 5.6 | 4.0 | 29.2 | 44.6 | 17.6 | 3.2 | 1.4 |
| 22 | " | 6.86 | 286 | 0.315 | 2.66 | 40900 | 41700 | 5.8 | 10.3 | 38.3 | 40.7 | 12.2 | 0.6 | 0.2 |
| Com. Ex. 4 | Et₃Al | 8.23 | 101 | 0.291 | 1.21 | 14400 | 12300 | 3.5 | 51.3 | 29.2 | 10.2 | 6.4 | 1.8 | 0.1 |
| 5 | Et₂AlCl | 10.44 | 69 | 0.285 | 0.27 | 9900 | 6600 | 3.2 | 83.5 | 3.9 | 4.6 | 2.6 | 2.3 | 2.3 |

Carrier component: Amount (mg) of the carrier-supported catalyst component (including the weight of the carrier)
Per metal: Amount of polymer yielded (g/g) per mmol of the supported transition metal
Per carrier: Amount of the polymer yielded (g/g) per gram of the carrier supporting the transition metal compound

EXAMPLES 23 AND 24 AND COMPARATIVE EXAMPLES 6 AND 7

An autoclave having an effective capacity of 2 liters was charged continuously with 1 liter/hour of hexane, 1 mmol/hour of triethyl aluminum and each of the carrier-supported catalysts (0.007 mmol calculated as the concentration of the titanium) prepared in Examples 14 and 21 and Comparative Examples 4 and 5, and ethylene was introduced at a rate of 300 g per hour. Hydrogen was simultaneously introduced so as to maintain the melt index of the resulting polyethylene at 0.2 to 0.5, and the operation was effected for 180 hours. The results obtained are shown in Table 6. In Examples 25 and 26, the operation was smooth. However, in Comparative Example 6 (in which the carrier-supported catalyst obtained in Comparative Example 4 was used), the discharge of the polymer failed in 10 hours after the initiation of polymerization because of the formation of a large quantity of polymer in the form of rice grains, and the operation had to be stopped. Furthermore, in Comparative Example 7 (in which the carrier-supported catalyst component obtained in Comparative Example 5 was used), the discharge of the polymer failed in 3 hours from the initiation of the polymerization. Also, the polymer was melted because of the inability to remove the heat of polymerization, and the operation became impossible.

3 kg/cm². A gaseous mixture of ethylene and propylene with a propylene content of 1.5 mol % was fed at 80° C., and polymerized for 2 hours at a total pressure of 7 kg/cm². The amount yielded of the ethylene/propylene copolymer was 295 g, and the copolymer had a melt index of 1.2 and 3 methyl groups per 1000 carbon atoms.

EXAMPLE 26

One liter of kerosene was placed in a 2-liter flask, and 0.2 mmol calculated as titanium of the carrier-supported catalyst component obtained in Example 19 and 2 mmols of triethyl aluminum were added. The mixture was heated to 70° C. Propylene was introduced at atmospheric pressure until the absorption of propylene ended, and then polymerized for one hour. There was obtained 139 g of polypropylene, which has a boiling heptane extraction residue of 46%.

EXAMPLES 27 TO 29

One mol of anhydrous magnesium dichloride was suspended in 850 cc of refined hexane, and each of the electron donors indicated in Table 7 was added dropwise at 35° C. in the course of one hour. The mixture was stirred for 30 minutes at 35° to 40° C., and a silicon compound was added at 50° C. The mixture was evaporated to dryness at 40° C. and 0.5 mmHg. 500 cc of titanium tetrachloride was added to the resulting solid, and the mixture reacted at 120° C. for 1 hour. The reac- Table 6

| Runs | Carrier-supported catalyst component used | Average amount Yeilded of the polymer (g/hour) | >42 | 42-60 | 60-100 | 100-150 | 150-200 | <200 |
|---|---|---|---|---|---|---|---|---|
| Ex. 23 | Component prepared in Example 14 | 300 | 5.0 | 37.4 | 34.4 | 11.2 | 9.0 | 2.8 |
| Ex. 24 | Component prepared in Example 21 | 300 | 3.6 | 28.6 | 34.6 | 15.2 | 12.2 | 5.8 |

Particle size distribution of the polymer obtained at the end of 190 hours after the initiation of polymerization (mesh)

EXAMPLE 25

0.014 mmol, calculated as titanium, of the carrier-supported catalyst component prepared in Example 14 and 3 mmols of triethyl aluminum were placed in 1 liter of kerosene, and hydrogen was introduced at a pressure of tion product was thoroughly washed with hexane, and the excessive titanium compound was removed.

Ethylene was polymerized in the same way as in Example 1. The results obtained are shown in Table 7.

Table 7

| Examples | Electron donors Type | Amount* | S: compound Type | Amount** | Transitional metal compound Type | Ti mg/g of catalyst | Cl mg/g catalyst | Polymerization of ethylene Polymerization activity per metal | per carrier | MI | Bulk density | Particle size distribution (wt.) >42 | <200 |
|---|---|---|---|---|---|---|---|---|---|---|---|---|---|
| 27 | $H_2O$ | 2 | $SiCl_4$ | 10 | $TiCl_4$ | 51 | 522 | 33,000 | 35,000 | 4.51 | 0.32 | 9.5 | 4.2 |
| 28 | $C_3H_7COOH$ | 4 | $SiCl_4$ | 10 | $TiCl_4$ | 64 | 594 | 18,300 | 24,700 | 1.46 | 0.30 | 6.6 | 4.4 |
| 29 | Ethanol | 6 | $SiHCl_3$ | 5 | $TiCl_4$ | 62 | 521 | 38,500 | 49,700 | 3.15 | 0.32 | 4.1 | 3.7 |

*, **: Mols per mol of magnesium.

EXAMPLES 30 TO 36 AND COMPARATIVE EXAMPLES 8 TO 9

[Preparation of Catalyst]

200 g of an anhydrous magnesium dihalide was suspended in 2 liters of refined kerosene, and each of the electron donors described in Table 8 was added dropwise at room temperature in the course of 1 hour. After the addition, the mixture was stirred for one hour, and then a halide of silicon or tin was added at room temperature in the course of 1 hour. Then, 15 mols of a transition metal compound was added, and the mixture was heated at 90° C. for 1 hour with stirring. The reaction product was thoroughly washed with refined kerosene to remove the excessive titanium or vanadium halide.

[Polymerization]

A 2-liter autoclave was charged with 1 liter of kerosene, 1 mmol of an alkylaluminum compound and 0.007 mmol, calculated as titanium or vanadium, of the carrier-supported catalyst, and the mixture was heated to 80° C. Hydrogen was added at a pressure of 4 kg/cm², and then ethylene was continuously fed so that the total pressure reached 8 kg/cm², and polymerized for 2 hours. The polymer was separated by filtration, and dried without removal of the catalyst. The data about the preparation of the carrier-supported catalysts and the resulting compounds are shown in Table 8, and the polymerization conditions and the results obtained are shown in Table 9.

Table 8

| Runs | $MgX_2$ | Electron donor Type | Amount* | Si or Sn compound Type | Amount** | Transition metal compound Type | Ti, V | X' |
|---|---|---|---|---|---|---|---|---|
| Ex. 30 | $MgCl_2$ | EtOH | 6 | $SiCl_4$ | 1.25 | $TiCl_4$ | 76 | 485 |
| 31 | " | n-HexOH | 6 | " | 5 | " | 66 | 512 |
| 32 | " | MeOH | 6 | $SnCl_4$ | 6 | $Ti(OEt)Cl_3$ | 64 | 488 |
| 33 | $MgBr_2$ | EtOH | 6 | $SiCl_4$ | 2 | $TiBr_4$ | 64 | 594 |
| 34 | $MgCl_2$ | $MeCO_2Et$ | 6 | $SiCl_4$ | 3 | " | 55 | 634 |
| 35 | " | " | 10 | " | 10 | $TiCl_4$ | 78 | 650 |
| 36 | " | " | 4 | " | 6 | " | 49 | 572 |
| Com. Ex. 8 | " | EtOH | 6 | — | 0 | $TiCl_4$ | 41 | 683 |
| 9 | " | $MeCO_2Et$ | 6 | — | O | $TiBr_4$ | 32 | 715 |

*, **: Mols per mol of magnesium.
Ti, V: Amount (mg/g) of the transition metal atom supported per gram of the carrier-supported catalyst.
X': Amount (mg/g) of the halogen atom supported per gram of the carrier-supported catalyst component.
Me: Methyl group, Et: ethyl group, Hex: hexyl group, component.
butyl group, X: halogen.

Table 9

| Runs | Organo-metallic component | Carrier component | Yield (g) | bulk density (g/cm³) | MI | Polymerization per metal | per carrier | Mn Mw | >42 | 42-60 | Particle size distribution of polymer (mesh wt. %) 60-100 | 100-150 | 150-200 | <200 |
|---|---|---|---|---|---|---|---|---|---|---|---|---|---|---|
| Ex. 30 | $Et_3Al$ | 4.43 | 364 | 0.351 | 2.64 | 52000 | 82200 | 5.9 | 5.3 | 20.0 | 33.9 | 18.4 | 15.2 | 7.1 |
| 31 | $iBu_3Al$ | 5.10 | 317 | 0.338 | 2.44 | 45300 | 62200 | 5.3 | 4.8 | 36.6 | 36.5 | 12.2 | 2.0 | 4.6 |
| 32 | $iBu_2AlCl$ | 5.26 | 285 | 0.342 | 2.61 | 40700 | 54200 | 5.5 | 3.5 | 20.1 | 39.7 | 21.9 | 14.3 | 0.5 |
| 33 | $Et_3Al$ | 5.26 | 280 | 0.330 | 2.80 | 41100 | 54800 | 5.3 | 5.0 | 21.8 | 36.5 | 21.4 | 10.0 | 5.3 |
| 34 | $Et_2AlCl$ | 6.14 | 132 | 0.325 | 0.65 | 18900 | 21500 | 5.6 | 3.9 | 35.5 | 31.1 | 18.5 | 7.1 | 3.9 |
| 35 | $Et_3Al$ | 4.32 | 351 | 0.333 | 2.35 | 50100 | 81300 | 5.6 | 4.0 | 29.2 | 44.6 | 17.6 | 3.2 | 1.4 |
| 36 | " | 6.86 | 286 | 0.315 | 2.66 | 40900 | 41700 | 5.8 | 10.3 | 36.3 | 40.7 | 12.2 | 0.6 | 0.2 |
| Com. Ex. 8 | $Et_3Al$ | 8.23 | 101 | 0.291 | 1.21 | 14400 | 12300 | 3.5 | 51.3 | 29.2 | 10.2 | 6.4 | 1.8 | 0.1 |
| 9 | $Et_2AlCl$ | 10.44 | 69 | 0.285 | 0.27 | 9900 | 6600 | 3.2 | 83.5 | 3.9 | 4.6 | 2.6 | 2.3 | 2.3 |

Carrier component: Amount (mg) per gram of the carrier-supported catalyst component (including the weight of the carrier).
Per metal: The yielded amount (g/mmol) of the polymer per mmol of the supported transition metal.
Per carrier: The yielded amount (g/g) of the polymer per gram of the carrier supporting the transition metal compound.

COMPARATIVE EXAMPLE 10

One mole of anhydrous magnesium dichloride was suspended in one liter of kerosene, and 6 mols of ethanol was added to the suspension. The mixture was stirred at 40° C. for one hour. Then, 2.5 mols of diethyl aluminum chloride, and then 1.5 mols of $TiCl_4$, were added. The reaction was performed at 120° C. for 1 hour. When the solid portion was separated and analyzed, it was found that 65 mg of Ti atom was detected per gram of the solid.

The catalyst so prepared was added to 1 liter of kerosene in an amount of 0.01 mmol calculated as titanium, and 2 mmols of $CH_3SiHCl_2$ was further added. Ethylene was polymerized in this system for 2 hours at 80° C. while passing hydrogen at a pressure of 4 kg/cm². The partial pressure of the ethylene was 4 kg/cm$^2$. No polymer was formed.

What is claimed is:

1. In a process for polymerizing or copolymerizing olefins in the presence of a catalyst consisting essentially of:
   A. from 0.001 to 0.5 millimols calculated as the titanium or vanadium atoms per liter of the inert organic liquid medium of a transition metal catalyst compound prepared by reacting in an inert organic liquid medium
      1. a titanium or vanadium compound selected from the group consisting of compounds of the formula TiX$_4$ wherein X is a halogen atom, compounds of the formula Ti(OR)$_{4-n}$X$_n$ wherein X is the same as defined above, R is an alkyl group, and n is zero or a positive number of less than 4, compounds of the formula VOX$_3$ wherein X is the same as defined above, and compounds of the formula VX$_4$ wherein X is the same as defined above, with
      2. a solid carrier of a magnesium compound; and
   B. at least 0.01 millimol per liter of the inert organic liquid medium of an organometallic compound catalyst component of a metal of Groups I to III of the periodic table selected from the group consisting of: compounds of the formula RM wherein R is an alkyl or aryl group, and M is lithium, sodium, or potassium; compounds of the formula R$_2$M' wherein R is the same as defined above and M' is zinc or cadmium; compounds of the formula R$_{2-l}$MgX$_l$ wherein R is the same as defined above, X is a halogen atom, and l is zero or 1; compounds of the formula MAlR$_4$ wherein R and M are the same as defined above; compounds of the formula R'$_{3-m}$AlX$_m$ wherein R' is a hydrogen atom, or an alkyl or aryl group, X is the same as defined above, and m is zero or a positive numer not greater than 3; compounds of the formula R'$_{3-n}$Al(OR)$_n$ wherein R' and R are the same as defined above, and n is a positive number greater than zero but not greater than 3; and compounds of the formula RAl(OR)X wherein R and X are the same as defined above; and with the proviso that where there are two or more of R, R', and X in the above formulae, they may be the same or different;

the improvement wherein the transition metal catalyst compound is formed by reacting together:
   a. a magnesium compound adduct which is the reaction product of
      aa. 1 mol of a magnesium dihalide, with
      ab. from 0.1 to 10 mols of an electron donor selected from the group consisting of: water; aliphatic alcohols; aliphatic carboxylic acids; aliphatic carboxylic acid esters; aromatic carboxylic acid ester; aliphatic ketones; and aromatic ketones; with the proviso that the acids and alcohols each have from 1 to 12 carbon atoms, the esters have not more than 12 carbon atoms in each of their constituent acid and alcohol moieties, and the ketones have not more than 13 carbon atoms, said reaction being carried out at a temperature of −10 to +100° C.;
   b. a compound of silicon or tin present in an amount of from 1/50 to 50 molar times per mol of the electron donor, having the formula R$_1$R$_2$R$_3$XSi, or R$_1$R$_2$R$_3$XSn, wherein R$_1$, R$_2$ and R$_3$ are the same or different, and are each selected from the group consisting of hydrogen, alkyl, aryl, alkoxy, aryloxy, and halogen, and wherein X is a halogen; and
   c. a compound of titanium or vanadium selected from the group consisting of compounds of the formulae: TiX$_4$; Ti(OR)$_{4-n}$X$_n$; VOX$_3$; and VX$_4$, wherein X is a halogen atom, R is an alkyl group having 1 to 12 carbon atoms, and n is zero or a positive number of less than 4.

2. The process of claim 1 wherein the electron donor is selected from the group consisting of water, saturated or unsaturated aliphatic alcohols having 1 to 12 carbon atoms, saturated or unsaturated aliphatic carboxylic acids having 1 to 12 carbon atoms, esters formed between saturated aliphatic carboxylic acids having 1 to 12 carbon atoms and saturated aliphatic alcohols having 1 to 12 carbon atoms, esters formed between saturated aliphatic carboxylic acids having 1 to 12 carbon atoms and unsaturated aliphatic alcohols having 2 to 12 carbon atoms, esters formed between unsaturated aliphatic carboxylic acids having 3 to 12 carbon atoms and saturated aliphatic alcohols having 1 to 12 carbon atoms, esters formed between unsaturated aliphatic carboxylic acids having 3 to 12 carbon atoms and unsaturated aliphatic alcohols having 2 to 12 carbon atoms; esters formed between aromatic carboxylic acids having 7 to 12 carbon atoms and saturated or unsaturated aliphatic alcohols having 1 to 12 carbon atoms the aliphatic ketones having 3 to 13 carbon atoms.

3. The process of claim 1 wherein the amount of the compound of Si or Sn is at least 1/4 molar times that of the donor.

4. The process of claim 1 wherein said olefin is selected from the group consisting of ethylene, propylene, a mixture of ethylene and another α-olefin, a mixture of ethylene or propylene and a diolefin, and a mixture of ethylene, another α-olefin, and a diolefin.

5. The process of claim 1 wherein said magnesium dihalide is magnesium dichloride or magnesium dibromide.

6. The process of claim 1 wherein the electron donor is present in an amount of at least 4 mols per mol of magnesium dihalide.

7. The process of claim 6 wherein the electron donor is present in an amount of at least 6 mols per mol of magnesium dihalide.

8. The process of claim 1 wherein the reaction between the magnesium dihalide and the electron donor is carried out at a temperature of from 0° to 100° C.

9. The process of claim 8 wherein the temperature is from 10° to 60° C.

10. The process of claim 1 wherein the reaction between the magnesium dihalide and the electron donor is carried out for a time of from 10 minutes to 2 hours.

11. The process of claim 1 wherein the magnesium compound adduct is firstly reacted with the silicon or tin compound and then secondly reacted with the titanium or vanadium compound.

12. The process of claim 11 wherein the first reaction is at a temperature of from −20° to +100° C. and the second reaction is at a temperature of from −20° to +140° C.

13. The process of claim 12 wherein the first reaction is at a temperature of from 20° to 40° C. and the second reaction is at a temperature of from 20° to 140° C.

14. The process of claim 1 wherein the magnesium compound adduct, the silicon or tin compound, and the titanium or vanadium compound are all reacted simultaneously.

15. The process of claim 14 wherein the reaction temperature is from −20° to +140° C.

16. The process of claim 15 wherein the reaction temperature is from 20° to 140° C.

17. The process of claim 1 wherein the alkyl groups have from 1 to 8 carbon atoms, the aryl groups are phenyl or naphthyl, the alkoxy groups have from 1 to 8 carbon atoms, the aryloxy groups are phenoxy or naphthoxy and the halogen atoms are chlorine or bromine.

18. The process of claim 1 wherein the compounds of silicon or tin are selected from the group consisting of silicon tetrahalides, silicon alkylhalides, silicon hydrohalides, tin tetrahalides, tin alkylhalides, and tin hydrohalides.

19. The process of claim 18 wherein the compounds are silicon tetrahalides or tin tetrahalides.

20. The process of claim 19 wherein the compounds are silicon tetrachloride or tin tetrachloride.

21. The process of claim 1 wherein the compounds of titanium or vanadium are titanium compounds only.

22. The process of claim 21 wherein the compound has the formula $TiX_4$.

23. The process of claim 22 wherein X is chloride.

24. The process of claim 1 wherein the organometallic compound catalyst component is a trialkyl aluminum, alkyl aluminum halide, alkyl aluminum hydride, dialkyl zinc, dialkyl magnesium, or alkyl magnesium halide.

25. The process of claim 1 wherein the organometallic compound is a trialkyl aluminum, dialkyl aluminum hydride or a dialkyl aluminum halide.

26. The process of claim 1 wherein the organometallic compound catalyst component is present in from 0.01 to 50 millimols per liter of the organic liquid medium.

* * * * *

UNITED STATES PATENT AND TRADEMARK OFFICE
CERTIFICATE OF CORRECTION

PATENT NO. : 4,071,672
DATED : January 31, 1978
INVENTOR(S) : Kashiwa

It is certified that error appears in the above-identified patent and that said Letters Patent are hereby corrected as shown below:

Claim 1, line 33, after "and", delete "1", insert --$\ell$--.

Signed and Sealed this

Twentieth Day of June 1978

[SEAL]

Attest:

RUTH C. MASON
Attesting Officer

DONALD W. BANNER
Commissioner of Patents and Trademarks